US007085673B2

(12) United States Patent
Picciotto et al.

(10) Patent No.: US 7,085,673 B2
(45) Date of Patent: Aug. 1, 2006

(54) DISPLACEMENT ESTIMATION SYSTEM AND METHOD

(75) Inventors: Carl E. Picciotto, Menlo Park, CA (US); Jun Gao, Mountain View, CA (US); Wei Wu, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/930,614

(22) Filed: Aug. 31, 2004

(65) Prior Publication Data

US 2006/0047473 A1 Mar. 2, 2006

(51) Int. Cl.
*G01B 21/02* (2006.01)
*G06K 9/32* (2006.01)

(52) U.S. Cl. ...................... 702/158; 382/294

(58) Field of Classification Search ............... 702/158; 382/294, 144, 145, 141, 199, 100; 430/22, 430/30; 348/87, 126; 356/617
See application file for complete search history.

(56) References Cited

U.S. PATENT DOCUMENTS

| | | | |
|---|---|---|---|
| 4,441,205 A | | 4/1984 | Berkin et al. |
| 4,581,760 A | | 4/1986 | Schiller et al. |
| 4,641,257 A | * | 2/1987 | Ayata ........................ 356/401 |
| 4,805,123 A | | 2/1989 | Specht et al. |
| 5,048,103 A | | 9/1991 | Leclerc et al. |
| 5,149,980 A | | 9/1992 | Ertel et al. |
| 5,204,739 A | | 4/1993 | Domenicali |
| 5,459,578 A | | 10/1995 | Park et al. |
| 5,581,638 A | | 12/1996 | Givens et al. |
| 5,621,813 A | * | 4/1997 | Brown et al. ............... 382/151 |
| 5,671,165 A | * | 9/1997 | Tomimatu .................... 702/94 |
| 5,965,307 A | * | 10/1999 | Miyatake .................... 430/22 |
| 6,068,954 A | * | 5/2000 | David .......................... 430/22 |
| 6,117,598 A | * | 9/2000 | Imai ............................. 430/22 |
| 6,118,132 A | | 9/2000 | Tullis |
| 6,195,475 B1 | | 2/2001 | Beausoleil, Jr. et al. |
| 6,225,012 B1 | * | 5/2001 | Nishi et al. .................. 430/22 |
| 6,312,859 B1 | * | 11/2001 | Taniguchi ..................... 430/22 |
| 6,456,378 B1 | * | 9/2002 | David ......................... 356/401 |
| 6,614,924 B1 | | 9/2003 | Aghajan |

(Continued)

FOREIGN PATENT DOCUMENTS

EP  0251504  1/1988

(Continued)

OTHER PUBLICATIONS

Hiroi et al., Precise Visual Inspection for LSI Wafer Patterns Using Subpixel Image Alignment, 1994 IEEE, pp. 26-34.*

(Continued)

*Primary Examiner*—Bryan Bui
*Assistant Examiner*—Toan M. Le

(57) ABSTRACT

A displacement estimation system including a data acquisition system and a processing system is provided. The data acquisition system is configured to capture a first frame from a first substrate including a first pattern and a second substrate including a second pattern at a first time and capture a second frame from a third substrate including a third pattern and a fourth substrate including a fourth pattern at a second time subsequent to the first time. The first pattern and the third pattern are substantially identical, and the second pattern and the fourth pattern are substantially identical. The processing system is configured to calculate a first displacement between the first pattern and the third pattern using the first frame and the second frame and calculate a second displacement between the second pattern and the fourth pattern using the first frame and the second frame.

37 Claims, 4 Drawing Sheets

U.S. PATENT DOCUMENTS

| | | |
|---|---|---|
| 6,721,667 B1 | 4/2004 | Banes et al. |
| 6,759,655 B1 * | 7/2004 | Nara et al. ............... 250/310 |
| 6,770,899 B1 | 8/2004 | Hasegawa et al. |
| 6,777,084 B1 | 8/2004 | Nagaoka |
| 6,898,306 B1 * | 5/2005 | Lu ........................ 382/151 |
| 6,903,821 B1 * | 6/2005 | Nara et al. ............... 356/394 |
| 6,919,577 B1 * | 7/2005 | Watanabe et al. ........ 250/559.4 |
| 6,936,358 B1 * | 8/2005 | Kume et al. ............. 428/702 |
| 6,937,337 B1 * | 8/2005 | Ausschnitt et al. ........ 356/401 |
| 6,937,349 B1 * | 8/2005 | Jones et al. ............. 356/617 |
| 6,941,008 B1 * | 9/2005 | Ando et al. ............. 382/145 |
| 6,941,009 B1 * | 9/2005 | Wienecke ................ 382/149 |
| 2004/0223883 A1 * | 11/2004 | Choi et al. .............. 422/82.05 |

FOREIGN PATENT DOCUMENTS

| | | |
|---|---|---|
| EP | 0987873 | 3/2000 |

OTHER PUBLICATIONS

Hiroi et al., Pattern Alignment Method Based on Consistency Among Local Registration Candidates for LSI Wafer Pattern Inspection, 2002 IEEE.*

Onishi et al., A Pattern Defect Inspection Method by Parallel Grayscale Image Comparison without Precise Image Alignment, 2002 IEEE, pp. 2208-2213.*

Leung, T.K., et al., "Finding Faces In Cluttered Scenes"; Computer Vision 1995; IEEE Comp. Soc.; Jun. 1995; pp. 637-644.

Heisele, B., et al., "Component-Based Face Detection"; Computer Vision 2001; IEEE Comp. Soc.; Dec. 8, 2001; pp. 657-662.

* cited by examiner

DISPLACEMENT ESTIMATION SYSTEM AND METHOD

CROSS-REFERENCE TO RELATED APPLICATIONS

This application is related to U.S. patent application Ser. No. 10/930,206, filed concurrently herewith, entitled DISPLACEMENT ESTIMATION SYSTEM AND METHOD and U.S. patent application Ser. No. 10/931,005, filed concurrently herewith, entitled DISPLACEMENT ESTIMATION SYSTEM AND METHOD. Each of the above U.S. Patent Applications is assigned to the assignee of the present invention, and is hereby incorporated by reference herein.

BACKGROUND

Various systems exist for the purpose of positioning one or more substrates in one or more locations to allow operations to be performed on the substrate or substrates. Some systems, such as alignment systems, attempt to position substrates by directly aligning one or more patterns on the substrates with the goal of a zero-length displacement. Moiré patterns or other particular patterns such as a box and a cross may be used for this purpose. However, the use of such patterns, particularly with respect to the precision gratings required to produce moiré or diffraction patterns, may add costs to the manufacturing process.

With existing alignment systems, the positioning of substrates may be poorly quantized and may not be useful in instances where a non-zero displacement is desired. Further, due to process variations, alignment systems that compare patterns across different substrates may run into performance limitations. It would be desirable to be able to accurately quantize the position or positions of substrates.

SUMMARY

One form of the present invention provides a displacement estimation system comprising a data acquisition system and a processing system. The data acquisition system is configured to capture a first frame from a first substrate including a first pattern and a second substrate including a second pattern at a first time and capture a second frame from a third substrate including a third pattern and a fourth substrate including a fourth pattern at a second time subsequent to the first time. The first pattern and the third pattern are substantially identical, and the second pattern and the fourth pattern are substantially identical. The processing system is configured to calculate a first displacement between the first pattern and the third pattern using the first frame and the second frame and calculate a second displacement between the second pattern and the fourth pattern using the first frame and the second frame.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

A system and method for determining the relative positioning between two substrates at different times through the use of image displacement calculations are provided. The image displacement calculations involve the process of identifying the locations of a pattern in each substrate in a reference frame, identifying the locations of the patterns in a comparison frame, and estimating the distance between the pattern locations to calculate displacements for each substrate. The displacements for each substrate may be subtracted to determine the relative displacement between the substrates. The displacements may be used to move the substrates into an exacting relative position or may be used to move a functional unit, such as a piece of fabrication equipment, relative to the substrates.

Figure 1:
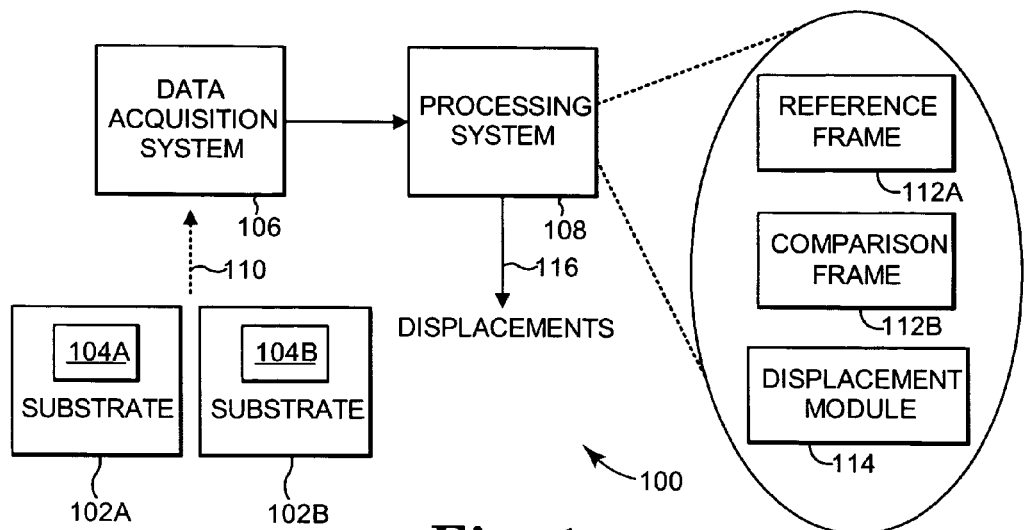
FIG. 1 is a block diagram illustrating a displacement estimation system according to one embodiment of the present invention.

FIG. 1 is a block diagram illustrating one embodiment of a displacement estimation system 100. Displacement estimation system 100 comprises at least two substrates 102A and 102B, a data acquisition system 106, and a processing system 108.

Substrate 102A includes a pattern 104A, and substrate 102B includes a pattern 104B. Substrates 102A and 102B may each be any suitable one, two, or three dimensional work object such as a silicon or other type of semiconductor wafer, paper, and a web of material. The term "web of material" covers both a web of material that carries objects (e.g., a conveyor) and the surface of a work object that is moveable relative to displacement estimation system 100.

Patterns 104A and 104B each comprise any feature or set of features that is man-made or naturally occurring on substrates 102A and 102B, respectively. Man-made features include alignment marks formed on substrate 102A or 102B, features formed on substrate 102A or 102B as part of a manufacturing process associated with substrate 102A or 102B, and features formed on substrate 102A or 102B prior to a manufacturing process associated with substrate 102A or 102B. Naturally occurring features include features of the substrate itself, e.g., paper fibers in paper, and contaminants on or within the substrate, e.g., dust on the surface of a semiconductor wafer. Pattern 104A or 104B may include broad-area features of substrate 102A or 102B, whether the features cover a large or small area of substrate 102A or 102B. Pattern 104A or 104B may be readily visible or visible only in response to an applied illumination field.

Data acquisition system 106 comprises any suitable optical or non-optical system configured to acquire data from substrates 102A and 102B at a first time to form reference frame 112A and acquire data from substrates 102A and 102B at a second time to form comparison frame 112B. Between the first time and the second time, substrates 102A and 102B may each be jointly or separately moved within system 100, e.g., moved relative to data acquisition system 106, or removed from system 100 entirely and replaced in system 100 jointly or separately. Accordingly, substrates 102A and 102B may be in different locations within system 100 at the first and second times. Frames 112A and 112B are used to identify the relative locations of patterns 104A and 104B at the first time and the second time, respectively, with reference to system 100. Examples of optical systems include one or more cameras or other devices configured to optically capture image 112. Examples of non-optical systems include electron beam devices or other devices configured to capture image 112 using non-optical means.

Data acquisition system 106 has a resolution and a scale appropriate for the type of substrates 102A and 102B. The resolution may be pixel, sub-pixel, or another suitable resolution, and the scale may be nanoscale or another suitable resolution. Frames 112A and 112B comprise any set of optical or non-optical images that comprise data that may be used to identify the relative locations of patterns 104A and 104B at two different times.

In operation, data acquisition system 106 captures reference frame 112A of substrates 102A and 102B that include patterns 104A and 104B, respectively, at a first time as indicated by a dashed arrow 110 and provides reference frame 112A to processing system 108. At a second time, data acquisition system 106 captures comparison frame 112B of substrates 102A and 102B that include patterns 104A and 104B, respectively, as indicated by dashed arrow 110 and provides comparison frame 112B to processing system 108. As noted above, substrates 102A and 102B may each be moved within system 100 or removed from system 100 and replaced in system 100 between the first time and the second time.

Processing system 108 receives and stores frames 112A and 112B, and processes frames 112A and 1121B using a displacement module 114. Using displacement module 114, processing system 108 identifies or locates patterns 104A and 104B in each of frames 112A and 112B. Processing system 108 identifies or locates patterns 104A and 104B by searching for patterns 104A and 104B in selected regions of frames 112A and 112B. The regions may be selected from anticipated locations of patterns 104A and 104B. The regions may be searched using coarse searching algorithms to locate general regions where patterns 104A and 104B are located and then using fine searching algorithms to locate the specific regions where patterns 104A and 104B are located. Processing system 108 calculates a first displacement between pattern 104A in reference frame 112A and pattern 104A in comparison frame 112B and calculates a second displacement between pattern 104B in reference frame 112A and pattern 104B in comparison frame 112B as indicated by an arrow 116. Processing system 108 may calculate the displacements to pixel or sub-pixel resolutions. To determine the relative position change of substrates 102A and 102B with respect to one another between the first time and the second time, processing system 108 subtracts the first displacement and the second displacement to calculate a third displacement using vector subtraction techniques as indicated by arrow 116. The third displacement indicates the relative position change of substrates 102A and 102B with respect to one another between the first time and the second time.

Displacement module 114 may embody any suitable algorithm for calculating the displacements between patterns 104A and 104B in reference frame 112A and patterns 104A and 104B in comparison frame 112B. Suitable algorithms may include an image cross-correlation algorithm, a phase delay detection algorithm, or other displacement estimation algorithms.

With the image cross-correlation algorithm, displacement module 114 uses image cross-correlations to calculate the displacement. One example of an image cross-correlation algorithm is a nearest neighbor navigation algorithm. With the nearest neighbor navigation algorithm, displacement module 114 uses image cross-correlations or comparison functions which approximate or parallel pixel-by-pixel correlation functions to calculate the displacement. The nearest neighbor navigation algorithm uses very short correlation distances in calculating the displacement. Additional details of nearest neighbor navigation algorithms may be found in U.S. Pat. No. 5,149,980 entitled "SUBSTRATE ADVANCE MEASUREMENT SYSTEM USING CROSS-CORRELATION OF LIGHT SENSOR ARRAY SIGNALS" listing Ertel et al. as inventors and U.S. Pat. No. 6,195,475 entitled "NAVIGATION SYSTEM FOR HANDHELD SCANNER" listing Beausoleil et al. as inventors. Each of these patents is assigned to the assignee of the present invention, and is hereby incorporated by reference herein.

With the phase delay detection algorithm (and other similar phase correlation methods), displacement module 114 processes images converted to a frequency domain representation and draws equivalences between phase delays and displacements to calculate the displacement.

In certain embodiments, displacement module 114 may calculate geometric extractions, such as centerlines, from patterns 104A and 104B in embodiments where patterns 104A and 104B are geometric patterns. In these embodiments, displacement module 114 calculates the displacements using the geometric extractions.

Functions performed by processing system 108 and/or displacement module 114 may be implemented in hardware, software, firmware, or any combination thereof. The implementation may be via a microprocessor, programmable logic device, or state machine. Components of the present invention, e.g., displacement module 114, may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Figure 2:
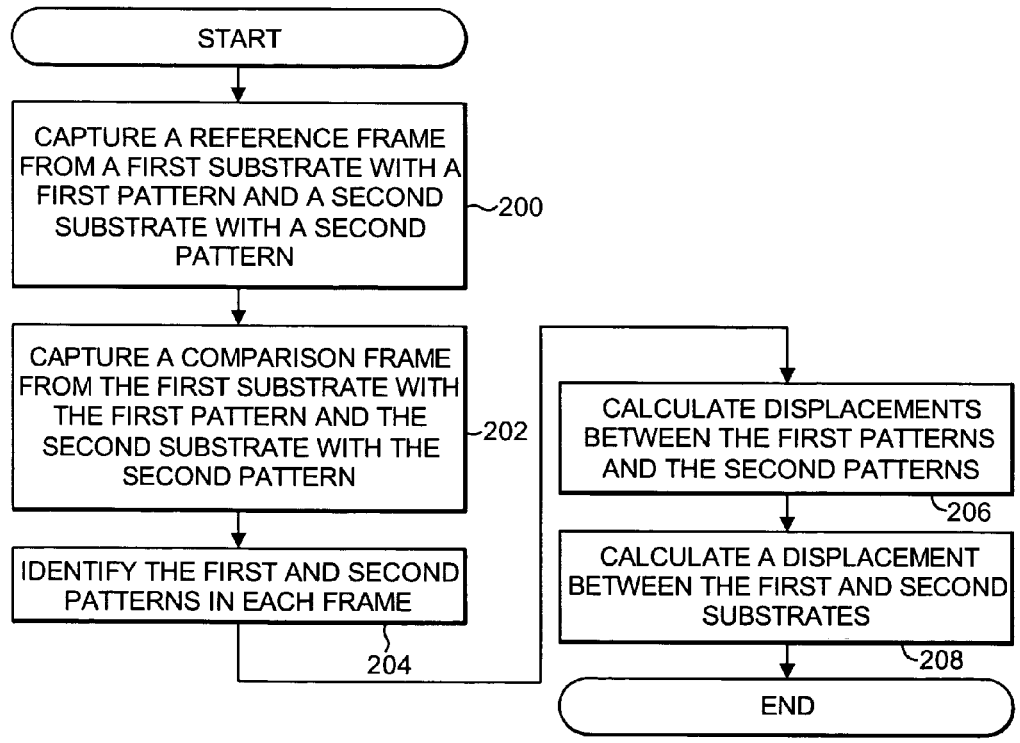
FIG. 2 is a flow chart illustrating a method for calculating a displacement according to one embodiment of the present invention.

FIG. 2 is one embodiment of a flow chart illustrating a method for calculating a displacement. The method shown in FIG. 2 may be implemented by displacement estimation system 100. Referring to FIGS. 1 and 2, data acquisition system 106 captures reference frame 112A from substrate 102A with pattern 104A and substrate 102B with pattern 104B at a first time as indicated in a block 200. Data acquisition system 106 captures comparison frame 112B from substrate 102A with pattern 104A and substrate 102B with pattern 104B at a second time as indicated in a block 202. Displacement module 114 identifies patterns 104A and 104B in each frame 112A and 1121B as indicated in a block 204. Displacement module 114 calculates a first displacement between pattern 104A in reference frame 112A and pattern 104A in comparison frame 112B and calculates a second displacement between pattern 104B in reference frame 112A and pattern 104B in comparison frame 112B as indicated in a block 206. Displacement module 114 calculates a third displacement between substrates 102A and 102B by subtracting the first displacement and the second displacement using vector subtraction techniques as indicated in a block 208. The third displacement indicates the relative position change of substrates 102A and 102B with respect to one another between the first time and the second time.

Figure 3A:
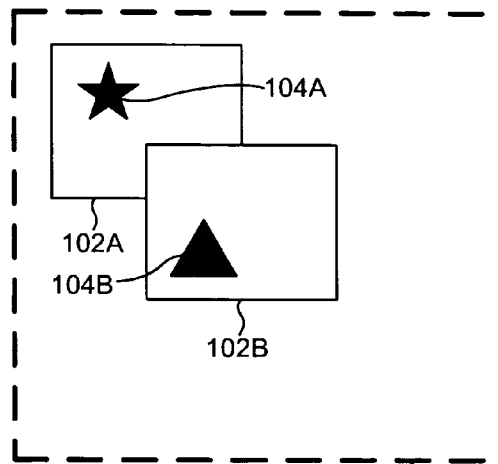
FIG. 3A is a block diagram illustrating substrates with patterns in a reference frame at a first time according to one embodiment of the present invention.
Figure 3B:
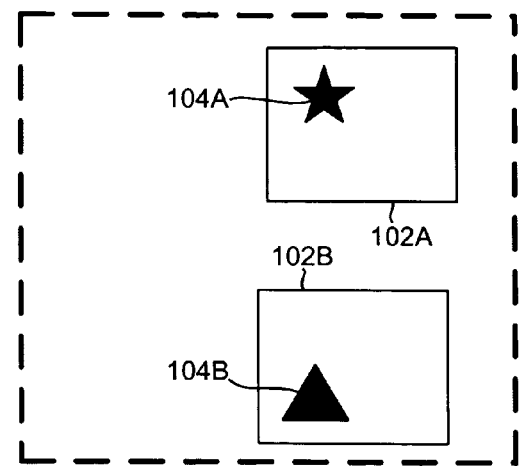
FIG. 3B is a block diagram illustrating substrates with patterns in a comparison frame at a second time according to one embodiment of the present invention.
Figure 3C:
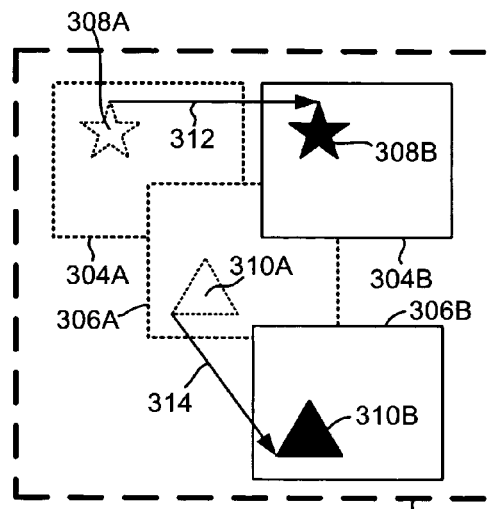
FIG. 3C is a block diagram illustrating locations of substrates at different times in an image frame according to one embodiment of the present invention.

FIGS. 3A–3C are block diagrams illustrating one embodiment of capturing frames 112A and 1121B that include substrates 102A and 102B with patterns 104A and 104B, respectively. In FIG. 3A, reference frame 112A includes substrate 102A with pattern 104A at a first location and substrate 102B with pattern 104B at a second location at a first time. Subsequent to the first time and prior to a second time, substrates 102A and 102B are either moved within system 100 or removed from system 100 and replaced in system 100. In FIG. 3B, comparison frame 112B includes substrate 102A with pattern 104A at a third location and substrate 102B with pattern 104B at a fourth location at the second time.

FIG. 3C is a block diagram illustrating the locations of substrates 102A and 102B at the first time and the second time in an image frame 300. Image frame 300 encompasses the same area as reference frame 112A and comparison frame 112B. The locations of substrates 102A and 102B at the first time are indicated by dashed-line boxes 304A and 306A, respectively, and the locations of patterns 104A and 104B at the first time are indicated by dashed-line patterns 308A and 310A, respectively. The locations of substrates 102A and 102B at the second time are indicated by solid-line boxes 304B and 306B, respectively, and the locations of patterns 104A and 104B at the second time are indicated by solid patterns 308B and 3101B, respectively.

By identifying pattern 104A in each frame 112A and 112B, processing system 108 calculates a displacement of pattern 104A using locations 308A and 308B as indicated by an arrow 312. By identifying pattern 104B in each frame 112A and 112B, processing system 108 calculates a displacement of pattern 104B using locations 310A and 3101B as indicated by an arrow 314.

Figure 3D:
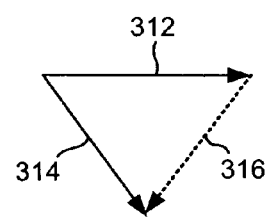
FIG. 3D is a schematic diagram illustrating calculating a displacement between two substrates at different times according to one embodiment of the present invention.

FIG. 3D is a schematic diagram illustrating calculating a displacement between substrates 102A and 102B from the first time to the second time. In FIG. 3D, the displacement between pattern 104A at the first time and pattern 104A at the second time is shown as arrow 312. Similarly, the displacement between pattern 104B at the first time and pattern 104B at the second time is shown as arrow 314. To determine the relative position change of substrates 102A and 102B with respect to one another between the first time and the second time, processing system 108 subtracts the displacement of pattern 104A and the displacement of pattern 104B to calculate a displacement indicated by a dashed arrow 316 using vector subtraction techniques. The displacement represented by dashed arrow 316 indicates the relative position change of substrates 102A and 102B with respect to one another between the first time and the second time.

Although shown in FIGS. 3A–3C as encompassing the entirety of substrates 102A and 102B, reference frame 112A and comparison frame 112B may encompass only selected portions of substrates 102A and 102B that include patterns 104A and 104B in other embodiments. In addition, the displacement of substrates 102A and 102B at the first and second times may be relatively small such that the locations of substrate 102A and/or 102B at the first time would overlap the locations of substrate 102A and/or 102B, respectively, at the second time from the perspective of data acquisition system 106. The displacement may also be relatively large such that the locations of substrate 102A and/or 102B at the first time would not overlap the locations of substrate 102A and/or 102B at the second time from the perspective of data acquisition system 106.

In other embodiments, substrates 102A and 102B may each include one or more additional patterns. Data acquisition system 106 may capture these additional patterns in reference frame 112A and comparison frame 1121B, and processing system 108 may calculate a displacement between each additional pattern of substrates 102A and 102B in these embodiments. The additional patterns may be used to sense rotational alignments of substrates 102A and 102B at different times.

Although substrates 102A and 102B are moved within system 100 or removed from system 100 and replaced in system 100 between the first time and the second time, substrates 102A and 102B are preferably in the same focal plane at the first time and the second time to avoid lateral movement uncertainties or magnification variations which may occur when changing focus or moving data acquisition system 106.

Although the above embodiments have been described such that substrates 102A and 102B are moved within system 100 or removed from and replaced in system 100, another substrate or substrates with patterns with substantially identical to patterns 104A and/or 104B may be placed in system 100 instead of the original substrates 102A and/or 102B at the second time in other embodiments. In these embodiments, reference frame 112A includes one of more images of the original substrates 102A and 102B with patterns 104A and 104B, respectively, and comparison frame 112B includes one of more images of the other substrate or substrates with the substantially identical pattern or patterns. Processing system 108 calculates the displacement between pattern 104A in reference frame 112A and the pattern substantially identical to pattern 104A in comparison frame 112B and calculates the displacement between pattern 104B in reference frame 112A and the pattern substantially identical to pattern 104B in comparison frame 112B. The substantially identical patterns may be exact replicas of patterns 104A and 104B or may vary slightly from patterns 104A and 104B due to fabrication or process differences. The level of variation between the patterns in the original substrates and the substantially identical patterns in the other substrates may depend on the resolution or scale of reference frame 112A and comparison frame 112B or on the ability of processing system 108 to recognize the patterns as identical. When the substantially identical patterns are not exact replicas of patterns 104A and 104B, the displacements calculated by processing system 108 may be offset by amounts that are proportion to the difference between the substantially identical patterns and patterns 104A and 104B. Such pattern deviations may be tolerated with an offset adjustment calculated by processing system 108.

In other embodiments, data acquisition system 106 may include two or more independent data acquisition systems, e.g., two cameras, located at a fixed distance from one another. In such an embodiment, data acquisition system 106 captures two reference frames and two comparison frames (not shown) such that each pattern appears in one of the reference frames and in one of the comparison frames. Data acquisition system 106 provides the two reference frames and two comparison frames to processing system 108, and processing system 108 identifies the patterns in the frames and calculates the displacements between the patterns according to the fixed distance between cameras.

Figure 4:
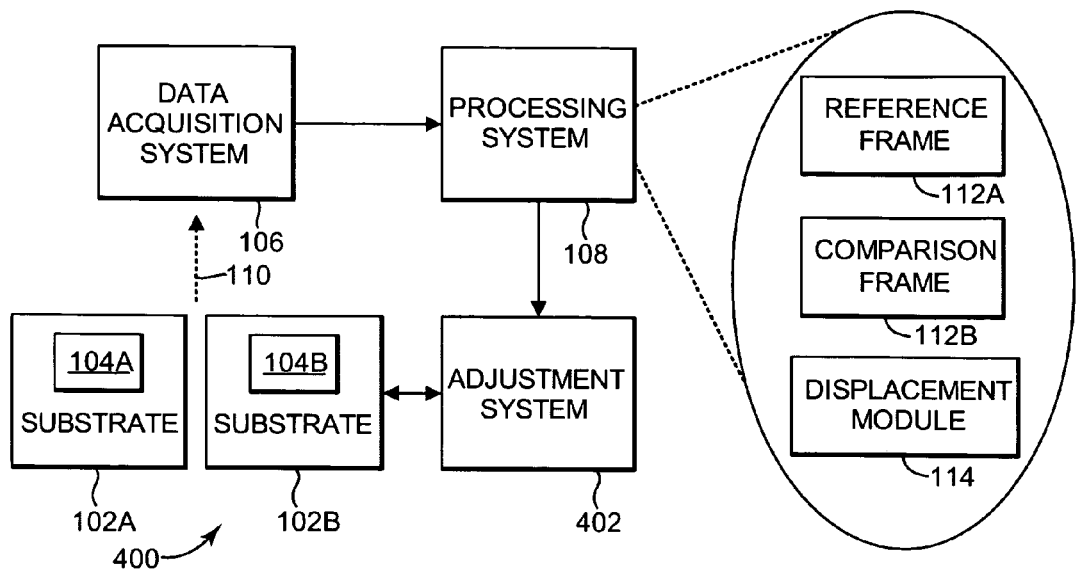
FIG. 4 is a block diagram illustrating a displacement adjustment system according to one embodiment of the present invention.

FIG. 4 is one embodiment of a block diagram illustrating a displacement adjustment system 400. Displacement adjustment system 400 comprises substrates 102A and 102B that includes patterns 104A and 104B, respectively, data acquisition system 106, processing system 108, and an adjustment system 402. In the embodiment of FIG. 4, adjustment system 402 receives the displacements associated with the relative positions of patterns 104A and 104B and the displacement associated with the relative position of substrates 102A and 102B from processing system 108 and adjusts the position of substrates 102A and/or 102B according to values of the displacements. The values represent distance values that indicate distances between patterns 104A and 104B at different times.

Figures 5, 7:
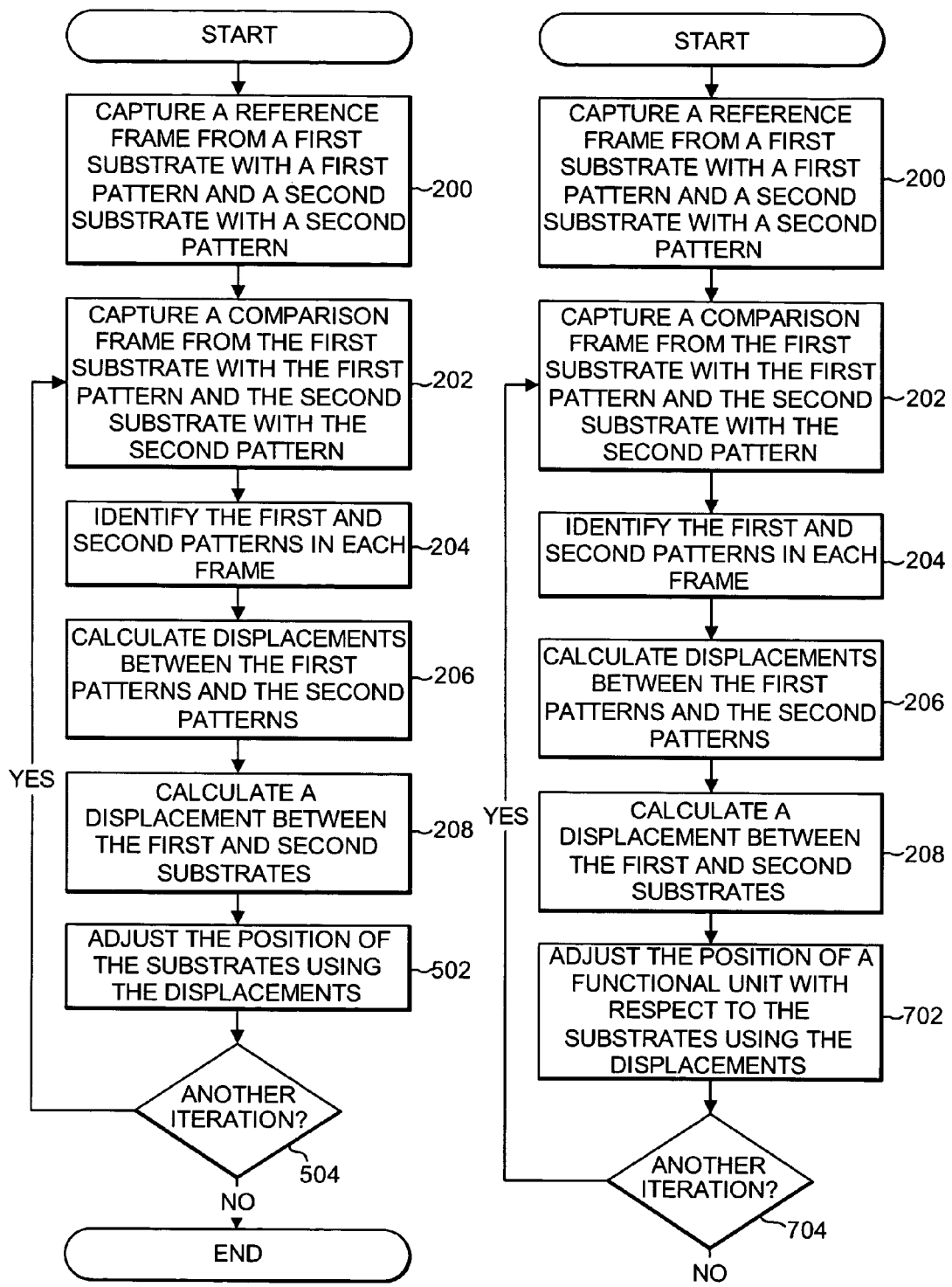
FIG. 5 is a flow chart illustrating a method for calculating and using a displacement according to one embodiment of the present invention.
FIG. 7 is a flow chart illustrating a method for calculating and using a displacement according to one embodiment of the present invention.

FIG. 5 is one embodiment of a flow chart illustrating a method for calculating and using a displacement. The method shown in FIG. 5 may be implemented by displacement adjustment system 400. Referring to FIGS. 4 and 5, data acquisition system 106 captures reference frame 112A from substrate 102A with pattern 104A and substrate 102B with pattern 104B at a first time as indicated in a block 200. Data acquisition system 106 captures comparison frame 112B from substrate 102A with pattern 104A and substrate 102B with pattern 104B at a second time as indicated in a block 202. Displacement module 114 identifies patterns 104A and 104B in each frame 112A and 112B as indicated in a block 204. Displacement module 114 calculates a first displacement between pattern 104A in reference frame 112A and pattern 104A in comparison frame 112B and calculates a second displacement between pattern 104B in reference frame 112A and pattern 104B in comparison frame 112B as indicated in a block 206. Displacement module 114 calculates a third displacement between substrates 102A and 102B by subtracting the first displacement and the second displacement using vector subtraction techniques as indicated in a block 208. The third displacement indicates the relative position change of substrates 102A and 102B with respect to one another between the first time and the second time.

Adjustment system 402 adjusts the position of substrates 102A and/or 102B using the displacements as indicated in a block 502. A determination is made by processing system 108 as to whether to perform another iteration as indicated in block 504. If another iteration is to be performed, then the functions of blocks 202 through 504 are repeated. If another iteration is not to be performed, then the method ends. In certain embodiments, the function of block 200 may also be repeated in one or more of the iterations.

Figure 6:
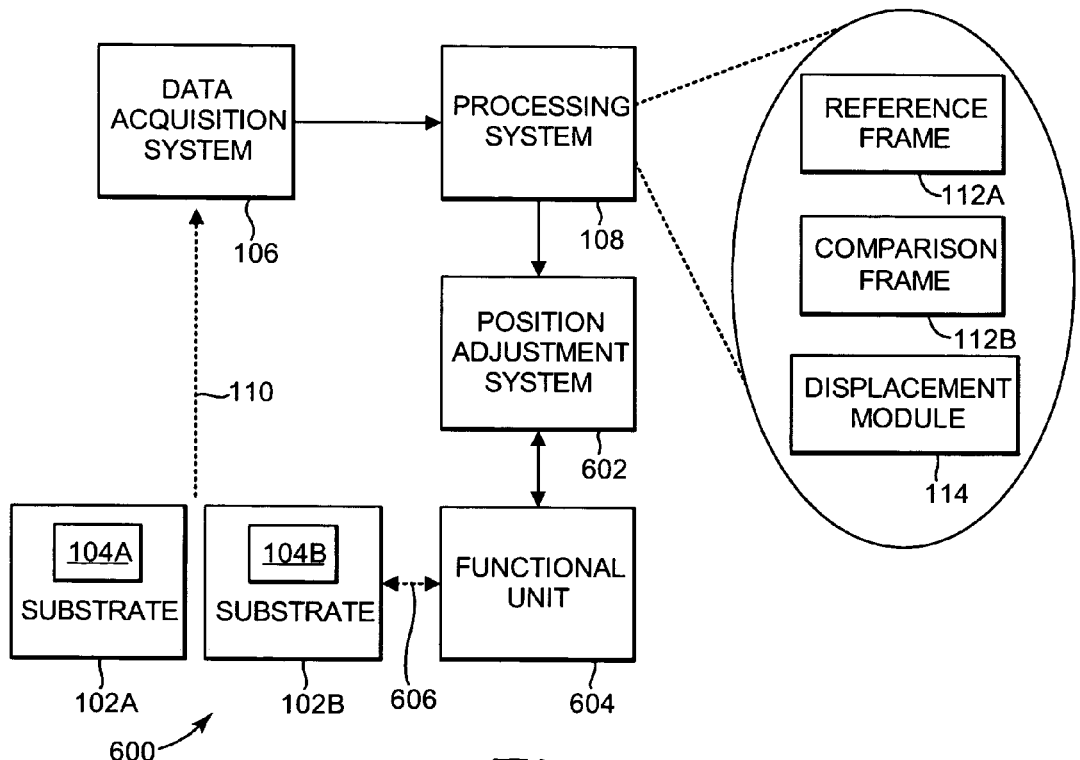
FIG. 6 is a block diagram illustrating a displacement adjustment system according to one embodiment of the present invention.

FIG. 6 is one embodiment of a block diagram illustrating a displacement adjustment system 600. Displacement adjustment system 600 comprises substrates 102A and 102B that includes patterns 104A and 104B, respectively, data acquisition system 106, processing system 108, a position adjustment system 602, and at least one functional unit 604. In the embodiment of FIG. 6, position adjustment system 602 receives the displacements associated with the relative positions of patterns 104A and 104B and the displacement associated with the relative position of substrates 102A and 102B from processing system 108 and adjusts the position of functional unit 604 relative to substrates 102A and/or 102B according to the values of the displacements as indicated by a dashed arrow 606. Functional unit 604 may be any system or apparatus configured to perform an operation on substrate 102A and/or 102B.

FIG. 7 is one embodiment of a flow chart illustrating a method for calculating and using a displacement. The method shown in FIG. 7 may be implemented by displacement adjustment system 600. Referring to FIGS. 6 and 7, data acquisition system 106 captures reference frame 112A from substrate 102A with pattern 104A and substrate 102B with pattern 104B at a first time as indicated in a block 200. Data acquisition system 106 captures comparison frame 112B from substrate 102A with pattern 104A and substrate 102B with pattern 104B at a second time as indicated in a block 202. Displacement module 114 identifies patterns 104A and 104B in each frame 112A and 112B as indicated in a block 204. Displacement module 114 calculates a first displacement between pattern 104A in reference frame 112A and pattern 104A in comparison frame 112B and calculates a second displacement between pattern 104B in reference frame 112A and pattern 104B in comparison frame 112B as indicated in a block 206. Displacement module 114 calculates a third displacement between substrates 102A and 102B by subtracting the first displacement and the second displacement using vector subtraction techniques as indicated in a block 208. The third displacement indicates the relative position change of substrates 102A and 102B with respect to one another between the first time and the second time.

Position adjustment system 602 adjusts the position of functional unit 604 with respect to substrates 102A and/or 102B using the displacements as indicated in a block 702. A determination is made by processing system 108 as to whether to perform another iteration as indicated in block 704. If another iteration is to be performed, then the functions of blocks 202 through 704 are repeated. If another iteration is not to be performed, then the method ends. In certain embodiments, the function of block 200 may also be repeated in one or more of the iterations.

In other embodiments, position adjustment system 602 may adjust the position of functional unit 604 with respect to one or more substrates other than substrates 102A and 102B using the displacements.

Displacement estimation system 100 and displacement adjustment systems 400 and 600 may be used in a wide variety of applications. The applications include lithography such as optical lithography, imprint or contact lithography, and nanoimprint lithography.

Embodiments described herein may provide advantages over previous alignment systems. For example, substrates may be positioned without the need to overlay patterns on top of each other. In addition, center lines may not need to be calculated. Further, patterns may not need to be symmetric or precisely formed. Still further, the use of costly moiré patterns and diffraction patterns with gratings may be avoided. Also, in embodiments where patterns existing in the substrate are used, space on the substrate may not need to be allocated for alignment marks. In addition, displacements between two substrates may be calculated without comparing a pattern on one substrate with a pattern on the other substrate. Further, embodiments described herein may automatically compensate for vibrations such that the substrate-to-substrate displacement calculations are unaffected where frames are captured simultaneously and the vibrations do not affect the data acquisition system. Still further, the data acquisition system may not need to be rigidly attached to a piece of manufacturing equipment to ensure accurate substrate-to-substrate displacement calculations. Lastly, patterns may be compared against previous images of themselves rather than physically different (though substantially identical) patterns.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A displacement estimation system comprising:
   a data acquisition system; and
   a processing system;
   wherein the data acquisition system is configured to capture a first frame from a first substrate that includes a first pattern and a second substrate that includes a second pattern at a first time and capture a second frame from a third substrate that includes a third pattern and a fourth substrate that includes a fourth pattern at a second time subsequent to the first time,
   wherein the first pattern and the third pattern are substantially identical, wherein the second pattern and the fourth pattern are substantially identical,
   wherein the processing system is configured to calculate a first displacement between the first pattern and the third pattern using the first frame and the second frame and calculate a second displacement between the second pattern and the fourth pattern using the first frame and the second frame.

2. The displacement estimation system of claim 1 wherein the processing system is configured to calculate a third displacement using the first displacement and the second displacement.

3. The displacement estimation system of claim 2 wherein the processing system is configured to calculate the third displacement by subtracting the first displacement and the second displacement.

4. The displacement estimation system of claim 1 wherein the data acquisition system is configured to provide the first frame and the second frame to the processing system, and wherein the processing system is configured to identify the first pattern and the second pattern in the first frame and identify the third pattern and the fourth pattern in the second frame.

5. The displacement estimation system of claim 1 further comprising:
   an adjustment system configured to receive the first displacement and the second displacement from the processing system;
   wherein the adjustment system is configured to adjust a position of the third substrate using the first displacement and the second displacement.

6. The displacement estimation system of claim 5 wherein the adjustment system is configured to adjust a position of the fourth substrate using the first displacement and the second displacement.

7. The displacement estimation system of claim 1 further comprising:
   a position adjustment system configured to receive the first displacement and the second displacement from the processing system;
   wherein the position adjustment system is configured to adjust a position of a functional unit relative to a fifth substrate using the first displacement and the second displacement.

8. The displacement estimation system of claim 7 wherein the fifth substrate includes the third substrate.

9. The displacement estimation system of claim 8 wherein the position adjustment system is configured to adjust the position of the functional unit relative to the fourth substrate using the first displacement and the second displacement.

10. The displacement estimation system of claim 1 wherein the first substrate includes the third substrate, wherein the second substrate includes the fourth substrate, wherein the first pattern includes the third pattern, and wherein the second pattern includes the fourth pattern.

11. The displacement estimation system of claim 1 wherein the first substrate, the second substrate, the third substrate, and the fourth substrate are each selected from the group consisting of a semiconductor wafer, paper, and a web of material.

12. The displacement estimation system of claim 1 wherein the first pattern, the second pattern, the third pattern, and the fourth pattern each comprise a man-made pattern.

13. The displacement estimation system of claim 1 wherein the first pattern naturally occurs on the first substrate, wherein the second pattern naturally occurs on the second substrate, wherein the third pattern naturally occurs on the third substrate, and wherein the fourth pattern naturally occurs on the fourth substrate.

14. The displacement estimation system of claim 1 wherein the data acquisition system comprises an optical system.

15. The displacement estimation system of claim 1 wherein the data acquisition system comprises a non-optical system.

16. The displacement estimation system of claim 1 wherein processing system is configured to calculate each of the first displacement and the second displacement according to a resolution selected from the group consisting of pixel resolution and sub-pixel resolution.

17. A method comprising:
   capturing a first frame from a first substrate including a first pattern and a second substrate including a second pattern at a first time;
   capturing a second frame from a third substrate including a third pattern substantially identical to the first pattern and a fourth substrate including a fourth pattern substantially identical to the second pattern at a second time subsequent to the first time;
   identifying the first pattern and the second pattern in the first frame;
   identifying the third pattern and the fourth pattern in the second frame;

calculating a first displacement between the first pattern and the third pattern using the first frame and the second frame; and calculating a second displacement between the second pattern and the fourth pattern using the first frame and the second frame.

18. The method of claim 17 further comprising:

calculating a third displacement using the first displacement and the second displacement.

19. The method of claim 18 further comprising:

calculating the third displacement by subtracting the first displacement and the second displacement.

20. The method of claim 18 wherein the first substrate includes the third substrate, wherein the second substrate includes the fourth substrate, wherein the first pattern includes the third pattern, and wherein the second pattern includes the fourth pattern.

21. The method of claim 20 further comprising:

adjusting a first position of the first substrate using the first displacement, the second displacement, and the third displacement; and adjusting a second position of the second substrate using the first displacement, the second displacement, and the third displacement.

22. The method of claim 20 further comprising:

adjusting a position of a functional unit with respect to the first substrate and the second substrate using the first displacement, the second displacement, and the third displacement.

23. A system comprising:

means for capturing a first frame at a first time from a first substrate including a first pattern and a second substrate including a second pattern;

means for capturing a second frame at a second time subsequent to the first time from a third substrate including a third pattern substantially identical to the first pattern and a fourth substrate including a fourth pattern substantially identical to the second pattern;

means for calculating a first displacement between the first pattern and the third pattern using the first frame and the second frame; and means for calculating a second displacement between the second pattern and the fourth pattern using the first frame and the second frame.

24. The system of claim 23 further comprising:

means for calculating a third displacement using the first displacement and the second displacement.

25. The system of claim 23 further comprising:

means for adjusting a position of the third substrate and a position of the fourth substrate using the first displacement and the second displacement.

26. The system of claim 23 further comprising:

means for adjusting a position of a functional unit relative to the third substrate and the fourth substrate using the first displacement and the second displacement.

27. The system of claim 23 wherein the first substrate includes the third substrate, wherein the second substrate includes the fourth substrate, wherein the first pattern includes the third pattern, and wherein the second pattern includes the fourth pattern.

28. The system of claim 23 wherein the first substrate and the second substrate are removed from the system entirely subsequent to the first time, and wherein the third substrate and the fourth substrate are placed in the system prior to the second time.

29. The system of claim 23 wherein the first frame comprises a reference frame, and wherein the second frame comprises a comparison frame.

30. The system of claim 23 wherein the first substrate, the second substrate, the third substrate, and the fourth substrate are each selected from the group consisting of a semiconductor wafer, paper, and a web of material.

31. The system of claim 23 wherein the first pattern, the second pattern, the third pattern, and the fourth pattern each comprise a man-made pattern.

32. The system of claim 23 wherein the first pattern naturally occurs on the first substrate, wherein the second pattern naturally occurs on the second substrate, wherein the third pattern naturally occurs on the third substrate, and wherein the fourth pattern naturally occurs on the fourth substrate.

33. A computer-readable medium having computer-executable instructions for performing a method of calculating first and second displacements, comprising:

receiving a first frame that comprises a first pattern embodied in a first substrate and a second pattern embodied in a second substrate;

receiving a second frame that comprises a third pattern embodied in a third substrate and substantially identical to the first pattern, and a fourth pattern embodied in a fourth substrate and substantially identical to the second pattern;

identifying the first pattern and the second pattern in the first frame;

identifying the third pattern and the fourth pattern in the second frame;

calculating the first displacement between the first pattern and the third pattern using the first frame and the second frame; and calculating the second displacement between the second pattern and the fourth pattern using the first frame and the second frame.

34. The computer-readable medium of claim 33 wherein the computer-readable medium has computer-executable instructions for:

calculating a third displacement using the first displacement and the second displacement.

35. The computer-readable medium of claim 33 wherein the computer-readable medium has computer-executable instructions for:

providing the first displacement and the second displacement to an adjustment system that is configured to adjust a position of the third substrate and a position of the fourth substrate using the first displacement and the second displacement.

36. The computer-readable medium of claim 33 wherein the computer-readable medium has computer-executable instructions for:

providing the first displacement and the second displacement to a position adjustment system configured to adjust a position of a functional unit with respect to the third substrate and the fourth substrate using the first displacement and the second displacement.

37. The computer-readable medium of claim 33 wherein the first substrate includes the third substrate, wherein the second substrate includes the fourth substrate, wherein the first pattern includes the third pattern, and wherein the second pattern includes the fourth pattern.

* * * * *